United States Patent [19]

Mercer

[11] 4,081,892
[45] Apr. 4, 1978

[54] METHOD OF MAKING COMPOSITE STRUCTURE

[75] Inventor: John E. Mercer, Kent, Wash.
[73] Assignee: Flow Industries, Inc., Kent, Wash.
[21] Appl. No.: 737,738
[22] Filed: Nov. 1, 1976
[51] Int. Cl.$^2$ ............................................. B23P 17/00
[52] U.S. Cl. ..................................... 29/421 R; 29/423;
29/557; 29/DIG. 26; 29/DIG. 45; 83/1; 83/53
[58] Field of Search ................ 29/421 R, 423, 557,
29/558, DIG. 8, DIG. 26, DIG. 45; 83/1, 53,
54, 177

[56] References Cited

U.S. PATENT DOCUMENTS

| 2,985,050 | 5/1961 | Schwacha | 83/177 X |
| 3,725,634 | 4/1973 | Lane | 29/423 X |
| 3,803,688 | 4/1974 | Peck | 29/423 X |

FOREIGN PATENT DOCUMENTS 1,225,804   3/1971   United Kingdom .................... 29/557

Primary Examiner—Victor A. DiPalma
Attorney, Agent, or Firm—Robert B. Hughes

[57] ABSTRACT

A method of forming a composite structure having precision surface openings, such as an air foil through which air can be drawn in for boundary layer control. A metallic face sheet is bonded to a base member that is formed with elongate channels which are to serve as air plenums. A protective metal strip is inserted into each channel, and a high velocity water jet is directed against the face sheet at the area of each channel to form a through slot opening. The protective strip protects the base material from the impact of the water after it passes through the slot being formed.

15 Claims, 8 Drawing Figures

METHOD OF MAKING COMPOSITE STRUCTURE

BACKGROUND OF THE INVENTION

1. Field of the Invention

The present invention relates to a method of making a composite structure, such as an aircraft air foil, and more particularly to a method of forming a composite structure with a chamber area and a precision opening leading thereto, such as an air foil having capability for boundary layer flow.

2. Brief Description of the Prior Art

In the aircraft industry, it has been found that higher strength to weight ratios can be obtained by use of composite structures where there is a high strength surface sheet, made of material such as titanium or aluminum, and a lower strength base material, such as a graphite impregnated epoxy resin. In some instances, there are advantages in making an aircraft structural component as a relatively large, bonded single structure. One benefit of this is that it eliminates the need of connecting together a number of small sub-components, which quite often entails the use of fasteners. The fasteners in turn cause added weight and require holes for the fasteners, which result in a decrease of strength in the structure. However, some of the manufacturing problems in making such composite structures are quite difficult to resolve. One particularly difficult problem arises where it is desired to form an air foil with the capability for boundary layer control.

It has long been known that the performance of air foils can be enhanced by drawing air in through the surface of the air foil at selected locations, to alleviate the problems of air turbulence adjacent to the air foil surface. This requires the formation of small precision openings or slots in the air foil surface, along with a plenum or some other means to maintain uniform air flow through the slots. For reasons of properly locating the slot and maintaining its width within quite close tolerances, it is desirable that the skin of the air foil first be bonded to the base member before the slot is formed. However, attempting to form a quite narrow precision slot in the sheet member of a composite structure already formed presents other problems, such as properly forming the slot without damaging or impairing the integrity of the overall structure, forming the slot without irregularities or jagged edges which might impair proper airflow therethrough, etc.

In view of the foregoing, it is an object of the present invention to provide a method of making a composite structure, such as an air foil, comprising a base member and a sheet member, secured one to the other and defining therebetween a chamber area, such as an air plenum, where there is a precision opening communicating through the sheet with the chamber area, such as a slot used for boundary layer control on an air foil.

SUMMARY OF THE INVENTION

In the method of the present invention, a base member and a sheet member of the composite structure to be formed are joined one to another in a manner to provide a chamber area defined by a portion of the sheet member and a portion of the base member. In this chamber area, there is provided a shield member located between the sheet portion and the base portion that defines the chamber area. A fluid jet nozzle is positioned proximate an exterior surface of the sheet portion adjacent the chamber, and a high velocity fluid jet is directed against the sheet portion to form an opening through the sheet into the chamber area. The impact of the fluid jet after it passes through the sheet member is dissipated by the shield member in the chamber area. In one embodiment, the shield member is removable, and is taken from the structure after the slot is formed. In a second embodiment, the shield member is formed as part of the composite structure.

In the preferred form of the present invention, the opening is formed as a slot, and the nozzle is moved over the sheet at a rate such that as the fluid jet cuts through the sheet, there is substantial dispersion of the fluid jet after it passes through the sheet being cut. In the preferred form of applying the present invention to the formation of an air foil with boundary layer control, the chamber area is an elongate recess (or a plurality of elongate recesses) in the base material to provide an elongate plenum chamber or chambers. The shield is in the form of a small strip of high strength material, such as a suitable metal, inserted in the channel formed in the base material. As a further modification, the shield member can itself be formed with a number of openings, so that at selected locations the fluid jet can be caused to form further openings through the base material. In the case of providing an air foil with boundary layer flow capability, such through openings in the base material would provide passageways for air to flow from the plenum to the vacuum pump.

DESCRIPTION OF THE PREFERRED EMBODIMENT

The preferred embodiment of the present invention is described herein with reference to forming a composite structure which is a section of an air foil of an aircraft, with the air foil having the capability of boundary layer control. Since some of the manufacturing techniques utilized in the present invention are well known in the aircraft industry, these will be illustrated only semi-schematically herein.

Figure 1:
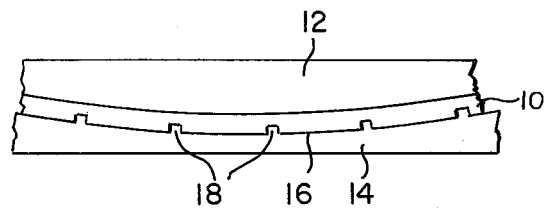
FIG. 1 is a fragmentary sectional view showing a first step in the method of the present invention by which a base member is formed.

In FIG. 1, there is illustrated the first step of the process of the present invention, by which a base member 10 is formed by means of upper and lower mold members 12 and 14, respectively. This base member 10 can be made of any of a number of materials used in a composite structure for aircraft. One such material is a graphite impregnated epoxy resin, which provides high strength relative to the weight of the material. The base member 10 has an outwardly directed convex surface 16, in which are formed a plurality of elongate recesses or channels 18. Conventional molding techniques can be used to form the base member 10 in the configuration shown in FIG. 1.

Figure 2:
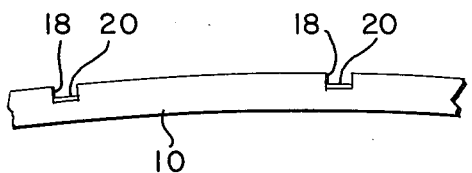
FIG. 2 is a side elevational view of a portion of the base member formed by the step shown in FIG. 1, with shielding strips bonded thereto.
Figure 3:
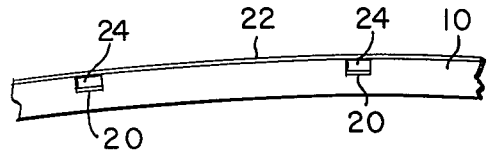
FIG. 3 is a view similar to FIG. 2 showing a composite structure made up of the base member of FIG. 2 with a metal sheet bonded thereto.

Subsequent to the formation of the base member 10, as shown in FIG. 2, a strip 20 of high strength material, such as titanium or aluminum, is placed in the bottom of each channel 18 and bonded to the base member 10. Then, as shown in FIG. 3, a high strength sheet member 22 is bonded to the convex structure 16 of the member 10. Again, conventional manufacturing techniques can be used to accomplish the steps illustrated in FIGS. 2 and 3. An examination of FIG. 3 shows that the composite structure formed has a plurality of closed chamber areas 24, defined by those portions of the base member 10 that define the channels 18, and by adjacent portions of the outer metal sheet 22. At the bottom of each chamber 24, there is the metal strip 20.

Figure 4:
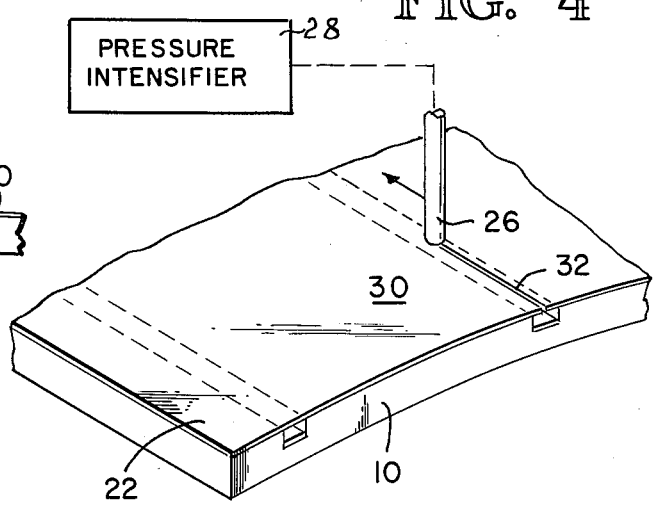
FIG. 4 is an isometric view of the composite structure of FIG. 3, showing a slot being cut by a high pressure water jet.

The next step is shown in FIG. 4, where there is illustrated, somewhat schematically, a nozzle section 26 of a high pressure fluid intensifier, indicated only schematically at 28. Such pressure intensifiers 28 are well known in the prior art, and one such intensifier is shown is U.S. Pat. No. 3,811,795, assigned to the assignee of the present invention. The function of this intensifier is to take in a fluid, such as water, and discharge this water through a small jet nozzle (e.g., having an orifice of approximately 0.002 to 0.010 inch in diameter) from a very high pressure source (e.g., in excess of 10,000 p.s.i. and normally at pressures up to fifty thousand to 100,000 p.s.i. or possibly higher). The velocity of the water jet discharged by such pressures can be as high as three thousand feet per second or higher.

As shown in FIG. 4, the jet nozzle 26 is placed in proximity to the exterior surface 30 of the sheet or skin 22 just above the location of one of the chambers 24. The pressure intensifier 28 is energized to direct a high velocity jet of water through the nozzle 26 and against the skin 22. As the water jet penetrates through the skin 22, the nozzle is moved in a direction parallel to the length of the channel-like chamber 24 to cut a precision slot 32 which opens into its related chamber 24. Desirably, the rate at which the nozzle 26 is moved to form the slots 32 is controlled so that the major portion of the energy of the fluid jet it utilized in forming the slot 32. In using a discharge nozzle having a diameter between about 0.002 to 0.004 inch, and with water being discharged at a pressure between 50,000 to 60,000 p.s.i., the rate of travel of the nozzle 26 would be between about 0.25 to 0.5 inches per minute, to form a slot in a titanium skin 22 between about 0.007 to 0.015 inch thich. These values are given by way of example and are not intended to limit the scope of the claims of the invention.

Figure 5:
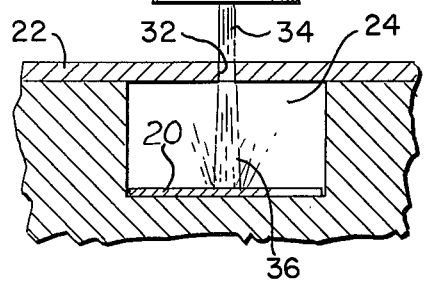
FIG. 5 is a sectional view drawn to an enlarged scale, illustrating the cutting action of the fluid jet shown in FIG. 4.

The manner in which the cutting action is accomplished is shown somewhat schematically in FIG. 5, wherein the water jet exiting from the nozzle 26 is indicated at 34. As the jet 34 impinges upon the sheet or skin 22, the portion of the water jet passing through the slot 32 being formed disperses as it passes into the chamber 24. This dispersed pattern of water is indicated at 36, and it can be seen that as the dispersed water 36 impacts the strip 20, it is further dispersed in the chamber 24, with the energy of the water being dissipated in the chamber 24. The impact of the water striking the strip 20 is not sufficient to penetrate the strip 20, so that the strip 20 essentially acts as a shield to protect the material of the base member 10. Thus, the slot 32 can be formed within very close tolerances, without causing any damage of any significance to the base member 10.

As indicated previously herein, the specific intended use of the present invention is to provide a composite structure for an aircraft having capability of boundary layer air flow. The channel or chamber 24 provides a plenum for air, and the slot 32 provides an opening through which the outside boundary layer air can flow inwardly through the sheet 22 which is the skin of the air foil. By forming the slot in the manner described herein, not only is the structural integrity of the material of the base member 10 maintained, but the slot 32 itself is formed with a minimum of jagged edges or irregularities which could otherwise degrade the proper flow of boundary layer air through slot 32.

Figure 6:
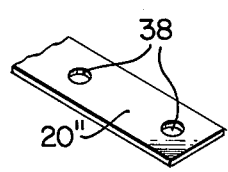
FIG. 6 is an isometric view similar to FIG. 4, showing a second embodiment of the present invention, wherein the shield strip is removably placed in the composite structure.

A second embodiment of the present invention is shown in FIG. 6. Components corresponding to components of the first described embodiment will be given like numerical designations, with a prime (') designation distinguishing those of the second embodiment. Thus, it can be seen that there is a base member 10' to which is bonded a sheet or skin 22' with channels 24° being formed in this structure. The essential difference in the second embodiment is that the shield strip 20' is not bonded to the base member 10', as in the first embodiment but is simply removably placed in the channel or chamber 24' before or subsequent to the bonding of the skin 22' to the base member 10'. After the cutting of the slot 32' is accomplished by means of the jet nozzle 26', the shield 20' is removed.

Figure 7:
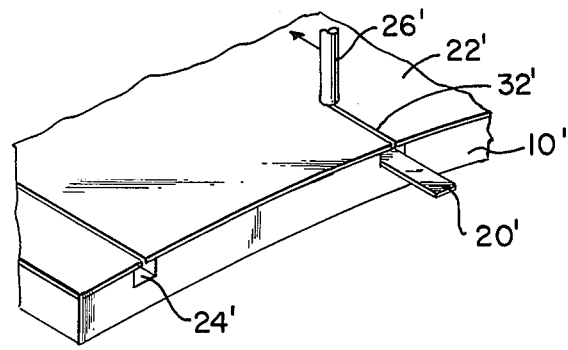
FIG. 7 illustrates a shield strip used in a third embodiment of the present invention.
Figure 8:
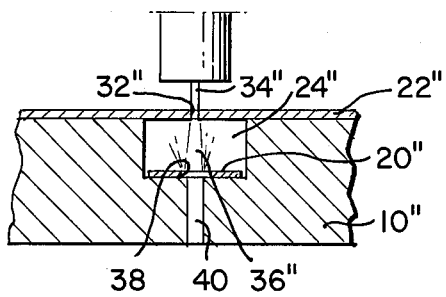
FIG. 8 is a view similar to FIG. 5 and illustrates a third embodiment of the present invention using the shield of FIG. 7.

Yet a third embodiment is shown in FIGS. 7 and 8, and components corresponding to the first two embodiments will be given like numerical designations with a double prime (") designation distinguishing those of the third embodiment.

As in the prior two embodiments, there is a skin or sheet 22" bonded to a base member 10" with a channel or chamber area 24" being defined thereby. The strip or shield member 20" is modified with respect to the first two embodiments in that a plurality of through holes 38 are formed at spaced intervals along the length of the strip 20".

In the method of this third embodiment, the strip of shield member 20" can be either bonded to the base member 10", as in the first embodiment, or removably inserted into the chamber 24", as in the second embodiment. During the cutting of the slot 32", as the water jet 34" passes through the slot 32" being cut, the lower portion 36" of the jet passes through each of the holes 38 to impinge directly on the exposed material of the base member 10" immediately below the opening 38. This forms holes in the base member 10" leading from the chamber 24", one of such holes being shown at 40. The rate of travel of the nozzle 26" can be controlled to insure the holes 40 are properly formed. In the end composite structure, the holes 40 so formed provide a passageway for the boundary layer air to be extracted from the plenum, which is the chamber of channel 24".

What is claimed is:

1. A method of making a composite structure, such as an air foil, comprising a base member and a sheet member, secured one to the other and defining therebetween a chamber area, such as an air plenum, and a precision opening communicating through the sheet with the chamber area, such as a boundary layer air suction opening for the air foil, said method comprising:
 a. providing a base member and a sheet member of a predetermined configuration,
 b. joining the base member and sheet member one to another to form a composite structure with a chamber area defined by a portion of the sheet member and a portion of the base member,
 c. also providing in said chamber area a shield member positioned between said sheet portion and said base member portion, and
 d. directing a high velocity fluid jet against an exterior surface of said sheet portion to form an opening therethrough, said fluid jet being oriented in a direction to impact said shield member after passing through said sheet portion.

2. The method as recited in claim 1, wherein said shield member is removably placed in said chamber area, and subsequent to forming said opening, said shield member is removed from the composite structure.

3. The method as recited in claim 1, wherein said shield member is joined to said composite structure in said chamber area.

4. The method as recited in claim 1, wherein said shield member is provided with at least one through opening, and said fluid jet is directed through said sheet to form the opening in said sheet, and also through the opening in said shield member to form a second opening in said base member.

5. The method as recited in claim 1, wherein said fluid jet is moved relative to said skin portion to form said opening as a slot-like opening, and said fluid jet is advanced relative to the skin portion at an adequate rate to cause a through slot to be formed while further causing a dispersion of the jet passing through the slot being formed.

6. The method as recited in claim 5, wherein the chamber area being formed is in the form of an elongate channel, and said opening in the skin is formed as an elongate slot opening to said channel.

7. The method as recited in claim 1, wherein said base member is formed with a recess to provide said chamber area, and the sheet is substantially planar and bonded to the base member to form the chamber area.

8. The method as recited in claim 1, wherein said sheet member is a high strength metal, and said base member is made of a material of lesser strength with respect to its ability to withstand fluid jet cutting.

9. A method of forming a section of an aircraft component, such as an air foil, having boundary layer control capability, said method comprising:
 a. providing a base member and a surface sheet member of a predetermined configuration, said base member being formed with at least one channel-like recess,
 b. joining the base member and the sheet member one to another to form a composite structure with the channel being enclosed as a chamber area defined by a portion of the sheet member,
 c. providing in said chamber area a shield member positioned between said sheet portion and said base portion, and
 d. directing a high velocity fluid jet against an exterior surface of said sheet portion to form a precision opening therethrough, with said fluid jet being discharged in a direction to impact the shield member after passing through the sheet portion, whereby said chamber area is in a configuration to function in the composite structure as a plenum for air, and said opening provides for flow of boundary layer air.

10. The method as recited in claim 9, wherein said shield member is removably placed in said chamber area, and subsequent to forming said opening, said shield member is removed from the composite structure.

11. The method as recited in claim 9, wherein said shield member is joined to said composite structure in said chamber area.

12. The method as recited in claim 9, wherein said shield member is provided with a through opening, and said fluid jet is directed through said sheet to form the opening in said sheet, and also through the opening in said shield member to form a second opening in said base member for flow of air from the plenum.

13. The method as recited in claim 9, wherein said fluid jet is moved relative to said skin portion to form said opening as a slot-like opening, and said fluid jet is advanced relative to the skin portion at an adequate rate to cause a through slot to be formed while further causing a dispersion of the jet passing through the slot being formed.

14. The method as recited in claim 13, wherein the chamber area being formed is in the form of an elongate channel, and said opening in the skin is formed as an elongate slot opening to said channel.

15. The method as recited in claim 9, wherein said sheet member is a high strength metal, and said base member is made of a material of lesser strength with respect to its ability to withstand fluid jet cutting.

* * * * *